May 9, 1967 A. M. STEFFEN 3,318,592
HOLDING DEVICE
Filed Oct. 20, 1964 2 Sheets-Sheet 1
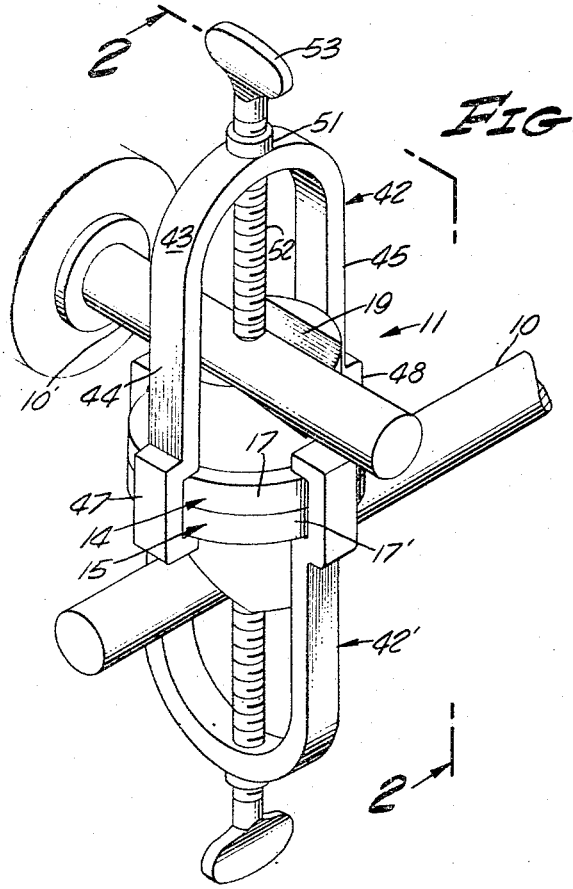
FIG. 1.
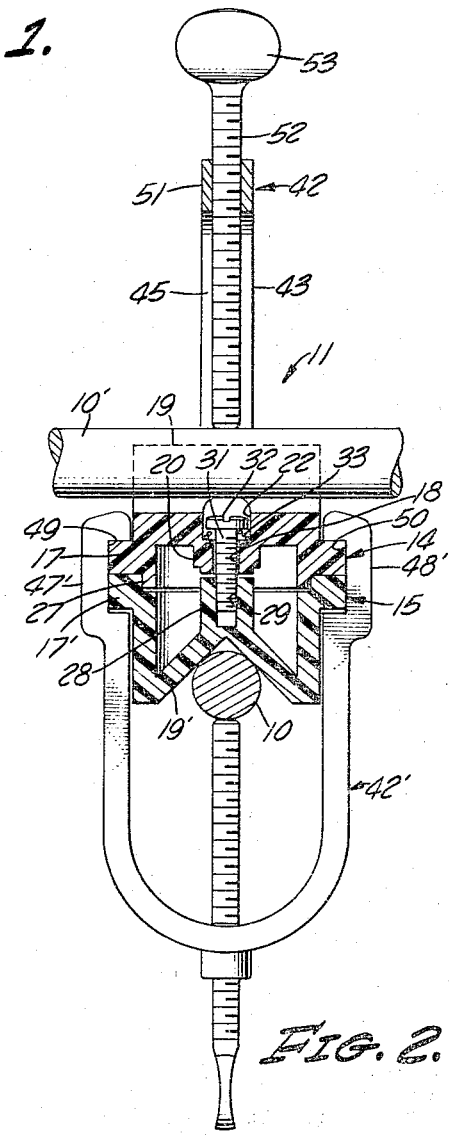
FIG. 2.
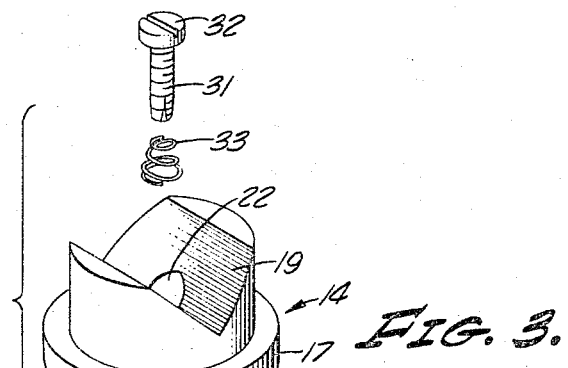
FIG. 3.
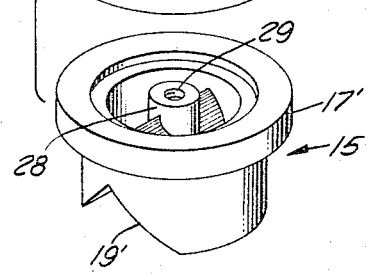
INVENTOR.
ARNOLD M. STEFFEN
BY Henzig & Walsh
ATTORNEYS May 9, 1967 A. M. STEFFEN 3,318,592
HOLDING DEVICE Filed Oct. 20, 1964 2 Sheets-Sheet 2

INVENTOR.
ARNOLD M. STEFFEN
BY
ATTORNEYS

_United States Patent Office_

3,318,592
Patented May 9, 1967

3,318,592
HOLDING DEVICE
Arnold M. Steffen, Box 2662, Van Nuys, Calif. 91404
Filed Oct. 20, 1964, Ser. No. 405,031
11 Claims. (Cl. 269—45)

This invention relates to an improved holding device adapted for use in holding work for drilling, milling, grinding and other operations of a similar nature. The holding device or appliance is also adapted for holding two work pieces relative to each other with precision and it is adaptable for use with work pieces in the form of round stock and other shapes as well. The holding device disclosed herein is an improvement over the work holder of Patent No. 3,103,352.

In the exemplary forms of the invention, as disclosed herein, it is a holding device or appliance of V-block and clamp type. By reason of its original and improved construction it has manifold capabilities, advantages and adaptabilities heretofore not available in holding appliances. In the Patent No. 3,103,352 the work holder shown comprised two circular V-blocks in which work pieces can be clamped. These V-blocks are rotatably held together. Each of them has circumferential grooves in which may be fitted in-turned parts or feet at the ends of clamping yokes which are provided with screws for clamping the work pieces in the V-blocks. The yokes may be used cooperatively with the annular groove in a single one of the V-blocks or cooperatively with the annular grooves in the two V-blocks. The blocks are rotatable relative to each other and/or they may be firmly clamped together. The yokes are rotatable relative to the V-blocks.

In an improved form of the holding device as disclosed herein, the V-blocks are formed with peripheral flanges or ribs juxtaposed together. The yokes are provided with end portions provided with a groove to receive and fit over juxtaposed flanges or ribs of the V-blocks. This holds the V-blocks together and they may be held in a relatively rotatable position or they may be tightly clamped together by means of the yokes and V-blocks.

A further and simplified form of the invention is disclosed herein made up of parts wherein the yokes are in effect integral with the V-blocks thus forming in effect, a single integral part or fitting. These fittings may be readily adapted from commercially available electrical wire clamps or wire holders as described in detail hereinafter. These fittings have generally cylindrical end parts and these end parts of two fittings are juxtaposed together, and then held rotatably together by a fitting or member in the form of a holding ring. In this manner a very versatile holding device can be very simply and economically fabricated and assembled, and if desired, may be adapted from fittings already available. The holding ring or coupling in this form of the invention serves a purpose similar to that of the end parts of the clamping yokes of the previous embodiment.

In the light of the foregoing the primary object of the invention is to provide an improved holding device of the type described wherein two V-blocks or clamping blocks may be rotatably held together by a single fitting or member engageable with juxtaposed portions of the clamping blocks.

Another object is to provide an improved holding device as in the foregoing object wherein the clamping blocks are held together by means formed at the ends of the legs of a single clamping yoke.

Another object is to provide an improved holding device as referred to in the foregoing wherein the clamping yoke and V-block or clamping block are in effect made as an integral unit thereby making it possible to adapt this unit from available fittings. Another object is to provide a holding device as described comprising two units as referred to having circular portions adapted to be juxtaposed and rotatably held together by a holding member or ring.

Further objects of the invention and additional advantages thereof will become apparent from the following detailed description and annexed drawings wherein:

FIGURE 1 is a perspective view of a preferred form of the invention;

FIGURE 2 is a sectional view taken along the line 2—2 of FIGURE 1;

FIGURE 3 is an exploded view of the V-blocks of FIGURES 1 and 2;

Figure 4:
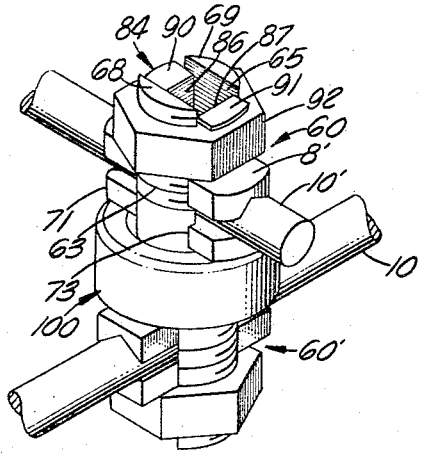
FIGURE 4 is a perspective view of another form of the invention.

Referring now more particularly to FIGURE 1 of the drawings, numerals 10 and 10' designate pieces of round stock being held by the holding devices of the invention. Numeral 11 designates the holding device assembly as a whole. FIGURE 2 shows a device in cross-section and FIGURE 3 shows the V-blocks separated from each other.

The work holder 11 comprises cylindrical or circular members 14 and 15. The member 14 has a peripheral rib or flange 17 having square shoulders. It has a V-notch 19 so that it forms a V-block. It has an axial bore 18 in an inwardly extending boss 20 and a counterbore 22. The member 14 has an extending skirt 27 adjacent to the rib 17.

The member 15 has a cross-section as shown in FIGURE 2. It is a generally cylindrical body as shown, having a peripheral flange or rib 17'. Formed in the cylindrical body is a V-notch 19' opposite from which is an internal boss 28 having a threaded bore 29. The V-blocks 14 and 15 are held together by a screw 31 having a head 32 received in the counterbore 22, there being a coiled compression spring 33 underneath the head 32. As can be seen, the two members 14 and 15 are rotatably held together by the screw 31 which is adjustable to hold them together with a desired degree of force. The members might also be held together magnetically.

If desired, one of the parts, for example 14, may be graduated in degrees which may move opposite to a vernier scale which may be provided on the other part 15.

FIGURE 1 shows a commonly used adaptability of the device. As can be seen, the parts can be rotated relatively through 360 degrees and set. As may be seen, a workpiece held may be accurately moved to any position on the surface of the sphere. The adaptability of the invention for inspection setups is thus apparent and as will be made even more clear as the description proceeds.

Numeral 42 designates generally a screw clamp or a yoke which may be used with the work holders. It is in the form of a yoke 43 as shown having legs 44 and 45. The legs 44 and 45 have end parts as shown at 47 and 48 which are offset outwardly and which are configurated to form internal grooves as shown of a size to fit over and receive the juxtaposed peripheral flanges or ribs 17 and 17' of the V-blocks 14 and 15. FIGURE 2 shows this relationship for yoke 42' which is like the yoke 42. In this manner the two V-blocks are rotatably held together by the yoke itself. At the closed end of the yoke it is provided with a threaded boss or bushing 51 receiving a screw threaded stem 52, the end of which is adapted to engage the work piece to be held. A rotating finger piece 53 is provided on the end of the stem 52. The yoke 42 is rotatable to any desired angular position relative to the V-blocks 14 and 15.

FIGURE 1 shows a second clamping yoke 42' which is identical with the clamping yoke 42 and therefore, the description will not be repeated. It cooperates with the ribs or flanges 17 and 17' on the V-blocks in a similar manner. It may clamp a work piece 10 in the V-block 15. As will be observed, when two work pieces 10 and 10' are clamped in the holding device, the two V-blocks 14 and 15 are tightly clamped together by the forces applied. The V-blocks may of course be tightly clamped together by clamping force applied by a single one of the clamping yokes.

As will be understood by those skilled in the art, the holding device may be mounted from the bed of a machine tool or may be mounted from any other platform. With one of the members secured to the other member described, it is rotatable relative to it so that the V-notch 19 can be aligned in any desired annular direction. The yoke 42 is rotatable as described to any angular position relative to the V-notch 19. Other shapes of stock or work pieces may be held against the flat end surfaces of the member 14 or the member 15 and the yoke 42 may have any angular position to accommodate the holding of such a work piece. The holding device is adaptable for holding two work pieces in precision relationship to each other. For example, as seen in FIGURE 1 the V-notch 19' of the V-block 15 is substantially at right angles to the V-notch 19 in the member 14. FIGURE 1 shows the holding device holding round stock illustrating use of the invention in an inspection setup. On the other hand, the holding device shown in FIGURE 1 may be mounted from other elements such as members adjustably held from a support platform or from upright supports or otherwise. Any geometrical or other positional relationship can be accurately realized and otherwise inaccessible or hard to reach places can be adapted for. The device as described is particularly advantageous from the standpoint of simplicity and economy, fabrication, production and use. All of the parts are easy to produce and assemble.

Figure 5:
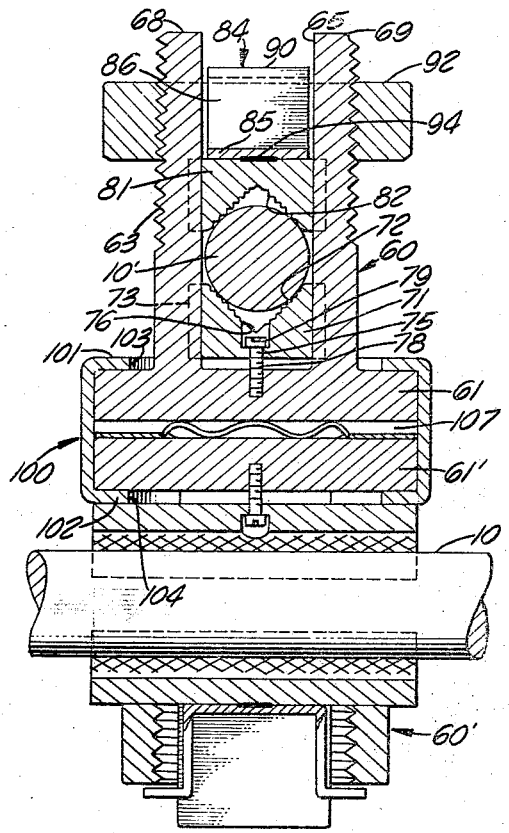
FIGURE 5 is a sectional view of a form of the invention shown in FIGURE 4.

FIGURES 4 and 5 show a modified form of the invention wherein the parts may be adapted from commercially available fittings. FIGURE 5 is a cross-section of the device shown in perspective in FIGURE 4. This device comprises two units or fittings 60 and 61 which are similar in construction to a form of commercially available electrical wire screw clamps or holders. Fitting 60 has a generally cylindrical base part 61 and an upwardly extending threaded part 63 which is slotted as shown at 65 to form a yoke having legs 68 and 69. Slidable in the lower part of the slide 65 is a sliding jaw member 71 having a serrated groove 72 in it. This member has slots in its sides one of which is designated at 73 in FIGURE 4 configurated to engage the sidewalls of the slot 65 in the fitting 63. The slide 71 has a central bore 75 and a counterbore 76 and in these bores is a screw 78 having a head 79 whereby the sliding jaw is floatingly held to the fitting 63.

Numeral 81 designates a similar sliding jaw oppositely positioned and having a serrated V-slot 82 as shown in FIGURE 5. Attached to the slider 81 is a U-shaped bracket 84 having a bottom web 85 and upwardly extending legs 86 and 87 which extend upwardly in the slot 65. At the ends of these legs are outwardly extending tabs 90 and 91 which fit over a hexagonal nut 92 threaded on to the threaded part of fitting 63. The bracket 84 is secured to the jaw 81 by being welded or soldered thereto as shown at 94. From the foregoing it will be observed that a work piece 10' may be held between the jaws 71 and 81 as shown in FIGURES 4 and 5. The upper jaw 81 can slide in the slot 65, that is it is adjustable by movement of nut 92 which carries th ebracket 84 with it. As may be seen, the legs 68 and 69 form a yoke the web of which is the cylindrical part 61 of the fitting 63.

The fitting 60' is identical to the fitting 60 so the description will not be repeated. It also forms a yoke structure having a generally cylindrical part 61' constituting the web of the yoke. The two cylindrical parts 61 and 61' of the holding devices are juxtaposed together as shown in FIGURE 5 and are rotatably held together by a holding member or ring 100 which is cylindrical having inturned flanges 101 and 102 and openings 103 and 104, out of which extend the cylindrical portions of the fittings or holding units of smaller diameter. Preferably there is interposed between the cylindrical portions 61 and 61' a spring washer 107 which is marcelled or has a wave in it so that it is resilient and tends to urge the two holding devices or units apart from each other with the cylindrical portions 61 and 61' engaged within the holding ring 100. The two units thus as may be seen are rotatable relative to each other. They are held together by a separate element, the yokes in effect being integral with the V-clamping jaws as described. When nut 92 is tightened down to clamp a work piece the lower jaw 71 seats in slot 65 and its end parts non-rotatably clamp against ring 100. Either or both devices 60 and 60' may be clamped to ring 100 in this manner.

From the foregoing those skilled in the art will observe that the form of the invention as described has similarity to the previous embodiment in that the two holding devices are held together in a similar manner. The device is extremely simplified, economical, and advantageous to use. As pointed out, the holding device may be adapted from commercially available fittings in the form of wire clamping devices or holders.

Figure 6:
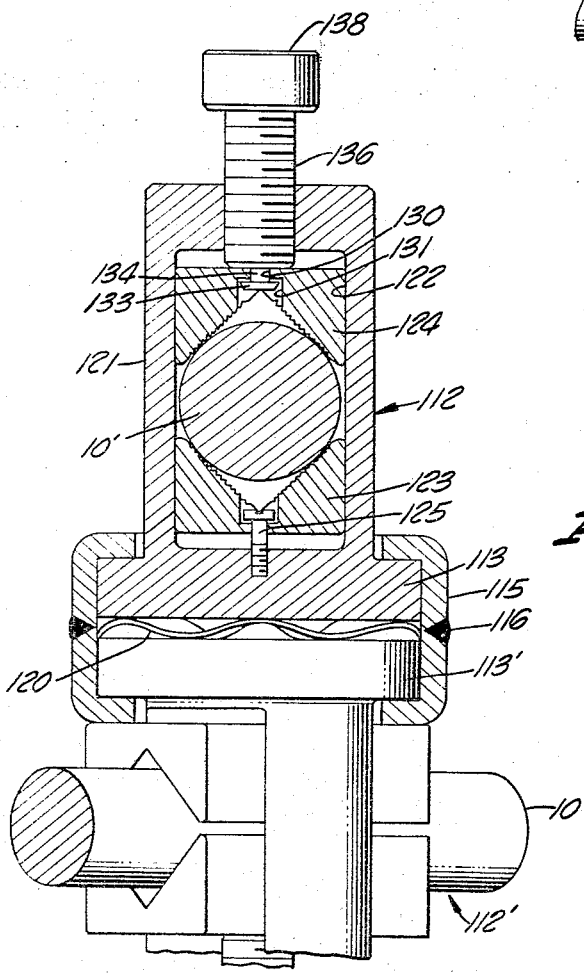
FIGURE 6 is a sectional view of another modified form of the invention.

FIGURE 6 shows a modified form of the invention in which the holding devices are made slightly differently. FIGURE 6 shows one of the devices in detail. It is designated generally at 112. It has a generally cylindrical end part 113 juxtaposed to another similar cylindrical end part 113' of another similar unit or holding device 112'. These cylindrical parts are held together by a ring member 115 formed in two parts welded together as shown at 116. This ring member is similar to the ring 100 of the previous embodiment. The parts 113 and 113' are held spaced apart by a similar resilient marcelled washer 120 similar to the washer 107 of the previous embodiment.

The fitting 112 has an upper cylindrical part 121 with a channel 122 in it to slideably receive jaws 123 and 124. Jaw 123 is like the jaw 71 of the previous embodiment. It is floatingly held by a screw 125. The jaw 124 is in an inverted position and is similar to the jaw 123. It has an end bore 130 and a counterbore 131 received in which is a head 133 on the end of a pin 134 extending from the end of a threaded stem 136 having an adjusting knob 138. The stem 136 is threaded in the end of the cylindrical part 121 of the fitting 112. By means of the threaded stem 136, the jaw 124 can be adjusted to clamp a work piece 10' in the holding device. The holding device of this embodiment is like that of the previous embodiment with the principal difference that the clamping is done by the threaded stem 136 rather than by the hexagonal nut of the previous embodiment.

From the foregoing those skilled in the art will observe that the invention achieves and realizes all of the objects and advantages of the invention as outlined in the foregoing as well as having many additional advantages which are apparent from the detailed description. The invention provides a very effective, useful and versatile holding device having the particular advantages of being extremely simple and economical to fabricate, produce and assemble. The device or devices feature the advantage of providing simplified and effective means for holding two devices together as described. This is particularly significant in connection with those forms of the invention wherein the clamping yoke and V-block are in effect made integral with two of these units rotatably held together.

The foregoing disclosure is representative of preferred forms of the invention and is to be interpreted in an illustrative rather than a limiting sense, the invention to be accorded the full scope of the claims appended hereto.

What is claimed is:

1. A holding appliance, adapted to clamp a work piece in an angular position in a plane comprising; a clamping block member having a yoke rotatably mounted relative thereto, said clamping block member having an end part having an end flange having a square annular shoulder, said yoke having legs having end portions providing square shoulders shaped to receive therein the said annular square shoulder of said flange whereby the yoke is rotatable relative to the clamping block, the yoke having means for clamping a work piece to said clamping block whereby the work piece and yoke can be rotated to any angular position relative to the clamping block member.

2. A holding appliance as in claim 1 including a second similar clamping block member, the end parts of the clamping blocks being juxtaposed adjacent each other and the said yoke having grooves in the ends of its legs providing square shoulders shaped to fit over the square shoulders formed on the flanges of the clamping blocks whereby to hold the clamping blocks together.

3. A device as in claim 2 including a second similar yoke similarly shaped to fit over the flanges on the clamping block members.

4. A holding appliance adapted to clamp a work piece in any angular position in a plane comprising first and second circular clamping block members, each of said members having an end flange forming an annular square shoulder, means for rotatably holding the two clamping blocks together with said end flanges juxtaposed adjacent each other, said means providing a pair of square annular shoulders adjacent to said flanges and having a configuration to receive said flanges to hold said clamping blocks together.

5. A holding appliance comprising a first holding device having an end flange providing a square annular shoulder and clamping means for clamping a work piece, a second holding device having a similar end flange providing a square annular shoulder, said end flanges being positioned adjacent each other and holding means engaging said end flanges for rotatably holding them together, said means having inwardly extending parts engaging said square shoulders and being constructed to resist axial movement of the holding devices away from each other.

6. A device as in claim 5, wherein said holding means is in the form of a ring encircling said flanges and having inwardly extending lips engaging surfaces of said flanges.

7. A device as in claim 5, wherein said clamping means comprises members extending from said end flanges forming a yoke having legs and means for clamping a work piece between said legs.

8. A device as in claim 7, wherein said yoke is in the form of a threaded member having a slot in it and said clamping means comprising a nut on said threaded member and a movable jaw carried thereby.

9. A holding device comprising a first clamping member having a circular end flange, a second similar clamping member having a similar circular end flange, said end flanges being juxtaposed adjacent each other, and means engaging with said end flanges for retaining said clamping members in relatively rotatable relationship, said means having a configuration providing portions engaging against circumferential surfaces of said end flanges and portions engaging against radially extending surfaces of said end flanges whereby said portions hold the clamping members together in relatively rotatable relationship.

10. A device as in claim 9 wherein said retaining means is in the form of a ring having inwardly extending lips interfitting with radial surfaces of said circular flanges on said clamping members.

11. A device as in claim 9 wherein said retaining means comprises a clamping yoke having end parts configurated to provide internal grooves having square shoulders configured to fit against portions of said circular end flanges for holding them together in juxtaposed relationship.

References Cited by the Examiner
UNITED STATES PATENTS

| | | | |
|---|---|---|---|
| 1,476,611 | 12/1923 | Hines | 77—62 |
| 2,364,150 | 12/1944 | Lowenstein | 77—63 |

WILLIAM W. DYER, JR., *Primary Examiner.*

W. D. BRAY, *Assistant Examiner.*